United States Patent [19]
Costanzo et al.

[11] Patent Number: 5,518,740
[45] Date of Patent: May 21, 1996

[54] PROCESS FOR THE PREPARATION OF YOGURT BASED FREEZE-DRIED FOODSTUFFS HAVING A SOLID SHAPE, AND PRODUCTS OBTAINED BY SAID PROCESS

[75] Inventors: Luigi Costanzo, Tremestieri Etneo, Conn.; Biagio Calcavecchia, Caronia-Me, Italy

[73] Assignee: Innovative Freeze-Drying Products (IFDP) N.V., Netherlands Antilles

[21] Appl. No.: 45,488

[22] Filed: Apr. 8, 1993

Related U.S. Application Data

[63] Continuation-in-part of Ser. No. 613,801, Dec. 13, 1990, abandoned.

[51] Int. Cl.⁶ ........................................................ A23C 9/12
[52] U.S. Cl. ............................ 426/34; 426/89; 426/302; 426/306; 426/317; 426/384; 426/517; 426/565; 426/583
[58] Field of Search ...................... 426/34, 38, 39, 426/42, 43, 89, 96, 249, 289, 302, 306, 317, 330.2, 564, 565, 570, 580, 583, 384, 385, 516

[56] References Cited

U.S. PATENT DOCUMENTS

| | | | |
|---|---|---|---|
| 2,751,687 | 6/1956 | Colton | 264/28 |
| 3,315,619 | 4/1967 | Slaybaugh | 425/317 |
| 3,464,834 | 9/1969 | Laskin | 426/385 |
| 3,985,901 | 10/1976 | Gonzalez Barberan | 426/43 |
| 4,293,573 | 10/1981 | Bradley, Jr. et al. | 426/43 |
| 4,427,701 | 1/1984 | Morley | 426/36 |
| 4,702,923 | 10/1987 | Tokumaru et al. | 426/61 |
| 4,797,290 | 1/1989 | Tokumaru et al. | 426/43 |

FOREIGN PATENT DOCUMENTS

1816761  7/1969  Germany.

*Primary Examiner*—Leslie Wong
*Attorney, Agent, or Firm*—Samuels, Gauthier, Stevens & Reppert

[57] ABSTRACT

A process for the preparation of yogurt based freeze-dried foodstuffs, said process being characterized in that it comprises the steps of cold mixing the ingredients homogeneously; prefreezing the ingredients and adding to them a gas at a percentage in the range between 10 and 50% of the initial volume of said ingredients, shaping the product so obtained into the desired shape; deep-freezing the product so shaped at a temperature between −20° C. and −40° C.; and freeze-drying the product so obtained down to a residual moisture between 3% and 8% as determined by the Karl Fisher method. The invention also relates to the products so obtained.

22 Claims, 2 Drawing Sheets

PROCESS FOR THE PREPARATION OF YOGURT BASED FREEZE-DRIED FOODSTUFFS HAVING A SOLID SHAPE, AND PRODUCTS OBTAINED BY SAID PROCESS

This is a continuation-in-part of application Ser. No. 07/613,801 filed on Dec. 13, 1990, now abandoned.

DISCLOSURE OF THE INVENTION

This invention relates to a process for the preparation of foodstuffs as solid bodies or as freezedried snacks and yogurt-based, and preferably it relates to a process of the type mentioned which allows yogurt based foodstuffs to be obtained which keep living milk ferments in high number, said products also having an original texture.

In the past years patents of invention have been granted which were concerned with the freeze-drying of yogurt cultures (U.S. Pat. Nos. 3,985,901 (Gonzalez Barberan) and 3,321,319 (Hockenberg)), said Patents teaching how to obtain a product in the form of a powder for reconstitution with water before eating the same and without living milk ferments.

Next some solutions have been put forward concerning processes for obtaining a final product containing living ferments, but said product again is an instant-type powder yogurt, and hence it is to be reconstituted with water before eating the same (U.S. Pat. No. 3,985,901 (Barberan) and Canadian patent No. 1,113,300 (Robern)).

In not one of the solutions suggested according to the prior art has a process been proposed that allows a product like that according to the present invention to be obtained. Indeed, the present patent application suggests a process that allows a product to be obtained for eating the same in the form of a solid product, i.e. without reconstituting it with water.

This has been made possible, among the other things, according to this invention, as the yogurt product is mixed with some ingredients before freeze-drying so as to give the same a pleasant taste and texture though the product, at the moment of being eaten is practically dry (moisture less than 8%).

When selecting the ingredients to be added to the yogurt product, it has been necessary to take into account many various aspects, because the final product:

it should not be very hygroscopic, as otherwise the product would stick to the hands or it would become soft just on exposing the same to atmospheric humidity;

it should be palatable and should have a pleasant taste;

it should have a pleasant texture;

it should be of a good mechanical strength, so as to resist the technological treatments for producing the same and during its distribution to the market.

Moreover, for the product obtained by the process according to this invention to be of real commercial interest and be suitable for production on industrial scale, it was necessary to find a formulation which was:

stable to thawing, as otherwise during the loading operation of the industrial freeze-dryers (which operation is much longer and laborious with respect to pilot freeze-dryers) the product would partially thaw, so causing an irremediable qualitative damage; capable to be freezedried in short times, so as to be a valid product from the economic standpoint and for reducing in a remarkable way the damage to the milk ferments, said damage being increasingly remarkable with increasing the time during which the freeze-dried layer is kept at the scorch temperature:

a product containing a minimum unfrozen water percentage, at the typical temperatures employed in industrial freezedrying processes, in order to prevent the physical structure of the frozen product during freeze-drying from undergoing the collapse phenomenon (the only way to avoid such drawback would be that of freezedrying the product employing very low temperatures of the heating plates, but in that way the freeze-drying cycle would become very long, so causing the cost of the product itself really prohibitive).

No one in the past years has tackled and solved such problems unless at a very low extent and with a very different and limited perspective, which contemplates very different final objectives.

For instance, Laskin in the U.S. patent application Ser. No. 3,454,834 has disclosed a process for freeze-drying ice-creams. This inventor in all his disclosure does not take in consideration the formulations, for which he makes reference to typical formulas which are to be found in "The Chemical Formulary", and he does not take in consideration the process by which the ice-cream is produced, for which he makes reference to the "Agriculture Handbook" No. 51.

The technical teaching which is most innovative consists in performing a "further cooling", at atmospheric pressure, i.e. in performing the operations of lowering the temperaturs of the ice-cream down to a value lower than that of stockage, before carrying out the freeze-drying process.

This "further cooling" is necessary because one of the main features of a good ice-cream is that of being soft and spreadable at the moment when it is eaten, which fact usually occurs immediately after drawing the ice-cream out of the freezer where it is stored. In order to get such objective, formulations are employed which make the frozen product soft while keeping a high percentage of not frozen water even at low temperatures. As a matter of practice, the thawing process of water in ice-creams is made as gradual as possible within a very wide temperature range.

This feature which is purposely obtained in ice-creams represents a heavy drawback as regards the freeze-drying process, especially in industrial freeze-dryers.

Indeed, when working on an industrial scale, a difficulty is met with which had not been met by Laskin, because he had carried out his experiments just on a pilot freeze-dryer, i.e. the thawing process of the product during the loading of the same.

In order to carry out the loading of an industrial freezedryer, it is necessary to draw the trolleys containing the trays with the deep-frozen product out the refrigerators, put them into the freeze-dryer chambers, close the freeze-dryer door airtight and start the vacuum pumps.

A period of at least 15–20 minutes elapses from the beginning of such operations and the moment when a high vacuum is attainad inside the freeze-dryer, during which period the product is at room temperature and the product becomes progressively thawed with negative consequences which can be very easily imagined.

Indeed, it is an indispensable requirement for the freezedrying process that the product is perfectly frozen because the freeze-drying process is defined as the transition of water from ice to the vapor state without passing through the liquid phase.

Water that possibly keeps not frozen at the temperature of the deep-frozen product during freeze-drying would act as a plastifying agent so causing the phenomenon of collapse and so giving a final product of poor quality.

In order to prevent ice-creams from collapsing, it is also compulsory to carry out the freeze-drying process by keeping the temperature of the product at a very low value, and this fact has the consequence that the duration of the cycle increases remarkably because the temperature difference between the product and the condenser (−40°/−45° C. in industrial freeze-dryer) decreases, with a very high increase in cost.

On the contrary, it is an object of this invention that of preparing a product suitable for many occasion (because it is a snack), endowed with a high nutritional value (because it supplies no "empty calories"), and is pleasant from the organoleptic standpoint, is obtainable at commercially compatible costs and can be produced by employing process parameters which are compatible with a production on an industrial scale.

Keeping into account all requirements mentioned above and all problems met with in the present-day technologies, and taking into account the objects mentioned above, for the products which are the objects of this invention it has been necessary to determine the process parameters as well as the formulation parameters by which all desired results set forth have been attained in a very precise way.

For instance, a particular care is to be necessarily exerted in selecting the kind of sugar, the preferred but not the only sugar to be employed being dextrose. Indeed, such sugar which is not very hygroscopic and which gives a pleasant taste to the finished product has a negative solution latent heat so that while it dissolves in the mouth gives a pleasant feeling of coolness. Moreover, this sugar allows a deep-frozen product to be obtained with a frozen water content which is sharply higher than that which is obtainable employing sugars which are commonly used in ice-cream formulations. Deep-frozen products prepared according to the ways disclosed in this invention are unacceptable as ice-creams because they are too hard. However as a contrast they give the advantage of being extremely easy to be freeze-dried.

Just for illustrative purposes we report herein below the amount of water that cannot be frozen, with reference to an amount of sugar of 1 g, for dextrose and for sugars which are more usually present in ice-creams, from which data it is evident that dextrose gives a high technological advantage.

| SUGARS | g Unfrozen Water/g of sugar |
| --- | --- |
| dextrose | 0.41 |
| fructose | 0.96 |
| sucrose | 0.56 |
| lactose | 0.69 |

Moreover, it is to be observed that in order to put into evidence that the objects to be attained in ice-cream formulations are exactly opposite to those to be followed in the formulation of the products to be obtained by means of the process according to this invention, we want to recall here the way in which Slade and Levine disclose the employment of SHP's (Starch Hydrolized Products) which are rich in fructose in order to obtain ice-creams which are softer at the freezer temperature just exploiting the fructose property of keeping a very high amount of unfrozen water per weight unit.

For the purpose of objectively demonstrate this difference between ice-cream and yougurt-based products, the unfrozen water content of a typical yogurt based formulation, to be processed according to this invention, has been determined by Differenzial Scanning Calorimetry (DSC).

The amount of unfrozen water reported in the following table has been determined by a calorimeter DSC Mettler TA 3000 with measuring cell DSC 30 (Type TC 10A FNR 29920 072 11).

The molten fraction has been calculated using the evaluation program "Enthalpy and degree of transition (H, $\alpha$)", of the said calorimeter, under the following experimental parameters:

start evaluation temperature=temperature of last glass transition before the melting peak;

end evaluation temperature=end temperature of the melting peak.

In the following table, the experimentally determined percentage of unfrozen water of typical yogurt based mixtures are compared with ice-cream values reported by G. Keeney:

| Product | Temperature −20° C. | Temperature −26° C. |
| --- | --- | --- |
| ice-cream | 15% | 12.5% |
| Yogurt based mix | 4% | 2,5% |

This data demonstrates that the amount of unfrozen water in ice-cream mixes, at usual freeze-drying temperature, is about 4 times higher than yougurt based mixes.

Also as regards to the technological aspect, remarkable differences can be found between the process according to this invention and the current technology for the production of ice-creams.

Ice-cream mixtures are prepared by a hot process, then they are pasteurized, homogenized and they are caused to aging whereas in the process claimed herein the mixture is to be prepared by a cold process and the mixture itself is not to be pasteurized and not to be homogenized, and in addition it is not to be caused to aging.

Such differences between the processes mentioned give rise to a sharp distinction between the ice-cream production process and the process according to this invention, and they show that the technical teaching concerning ice-creams are completely inapplicable to the production of the yogurt-based freeze-dried products according to this invention. Moreover, as a support to what has been set forth herein above, we wish also to mention what has been set forth by Arbucle, 1981 "Mix processing procedures most effective in influencing body and texture are pasteurization, homogenization and aging".

The heat treatment employed in the usual technology for production of ice-creams serves the purpose of opening the molecules of the stabilizing agents, which just in that way succeed in exerting completely and efficiently their function of binding water.

In the process suggested in this invention, the mixing operation is carried out without performing any kind of heating. All ingredients are added to yogurt, which is employed at the normal temperature for its storing, that is +4° C.

Among the other things, any kind of heat treatment would be of extreme damage to the process according to this invention, because it would damage milk ferments which, on the contrary are to be kept alive in this process in the highest possible number even in the finished product.

Aging is another unit operation which is typical of ice-cream technology but which is never carried out in the process claimed in this invention.

Indeed, aging is necessary to obtain an icecream endowed with good features but it is not possible to set forth the same in the case of a yogurt-based product. Aging is important indeed to obtain a slow reformation of fatty compound crystals which had been destroyed by heating.

It is extremely important to observe that in the process claimed herein the best characteristics of the finished product are kept, by subjecting the cold-prepared mixture immediately to processing, because the low pH value of yogurt makes the mixture very unstable.

Because of this reason, when the mixing process is over, the operations of cooling, forming and deep-freezing are carried out immediately.

A further difference between the products obtained by means of the process of this invention and usual ice-creams consists in the amount of trapped air. It is usually of 60–100% in ice-creams and of 30–40% in soft serves whereas in the products of this invention the air trapped is at a percentage not higher than 30%.

Indeed, a high percentage of trapped air is incompatible with a good freeze-drying, because air trapped within the product when the high vacuum is obtained, shows a tendency to an increase in volume so giving rise to the swelling of the product, such swelling being increasingly high with increasing the amount of air trapped and the amount of unfrozen water.

In the process according to this invention, the minimum amount of air is added, said air being necessary to make the product less viscous and more plastic during its cooling before the forming operation so as to allow the realization of an easier transfer of the same by means of pumps.

This requirement is obvious if one considers the fact that the mixing operations according to this invention supply mixtures containing a high percentage of freezable water which is associated with a relatively low soluble residue and which would have a tendency as a consequence to become easily frozen at temperatures a little lower than 0° C.

On the other side, a high percentage of air trapped inside the product is not advantageous for freeze-drying because of the reasons that have been illustrated before, and in addition such air would make a finished product so brittle that it is difficult to keep the pieces integral during the following manipulations occurring in the process and in the distribution of the product.

Moreover, if a continuous type process is desired, and as a consequence it is necessary to carry out the process of this invention under pressure, it is necessary to take into account also the values of the pressure of operation during the cooling process.

With reference to that, the Applicant has carried out some research which showed that the employment of pressure values like those usually employed in the technology of ice-cream production together with the thermal shock caused by the cooling process that precedes the operation of forming the product, affect the survival of yogurt ferments in a very negative way.

The following table puts into evidence the destruction of the living milk ferments as average values in tests carried out by cooling at different pressures and employing mixtures prepared from different yogurt brands:

| Pressure during cooling (bar) | Destruction of milk ferments |
|---|---|
| 0 | <50% |
| 1 | 50–60% |
| ≧2 | >99% |

In order to obviate this drawback, so as to obtain a high concentration of living milk ferments in the finished product, it was necessary to find out an innovative technological solution capable of carrying out a continuous cooling of the product before forming the same, keeping the pressure at a value not higher than 1 bar.

Though no claim has been made in this patent application for the apparatus employed, it was also necessary to realize an apparatus capable of working at low pressure to carry out a continuous rapid cooling as well as the extrusion so as to keep the optimal pressure value automatically.

Accordingly, it is a specific object of this invention a process for the preparation of yogurt based freezedried foodstuffs, which process comprises the steps of:

a) cold mixing the ingredients homogeneously;

b) pre-freezing the ingredients and adding a gas at a percentage in the range between 10 and 50% of the initial volume of the ingredients;

c) shaping the product so obtained into the desired shape;

d) deep-freezing the product so shaped at a temperature between −20° C. and −40° C.;

e) freeze-drying the product so obtained down to a residual moisture between 3% and 8% (as determined by the Karl Fisher method).

Preferably according to this invention, after the step e), an icing step f) is carried out employing chocolate or equivalent product, or otherwise a coating step is realized employing a film of cellulose, gum, wax, maltodextrins, milk proteins or sugars.

Moreover, according to this invention, a packaging step g) is carried out after said step f).

The mixing of the ingredients according to step a) occurs preferably at a maximum temperature of +10° C.

Moreover, a time no longer than 0.5 hours should elapse between the step a) and the step b) of the process according to this invention.

The step of adding a gas, preferably air or nitrogen, is carried out preferably at a pressure less than or equal to 1 bar and gas is added in amounts between 10 and 30% of the initial volume.

The shaping process according to the step c) is realized preferably by extrusion at −5°/−9° C. and the thickness of the product is lower than 15 mm, and preferably it is between 8 and 12 mm.

The rapid freezing according to the step d) is carried out preferably down to −30° C. in a period of 20 minutes.

The freeze-drying of the step f) is carried out preferably according to this invention at a maximum surface temperature of +30° C., and reaching a final residual moisture in the range between 4% and 6%.

Moreover, the yogurt based freeze-dried foodstuffs obtained according to the process disclosed herein above are also to be considered in the scope of this invention, said foodstuffs comprising:

| yogurt | 10–85% |
|---|---|
| fruit | 0–85% |
| sugars | 0–25% |
| other ingredients | balance to 100% |

More particularly, the product so obtained has a texture determined according to the Test 1, which is identified by the following values

| Modulus (kg mm$^{-1}$) | 1.8–5.0 |
|---|---|
| Hardness (kg) | 3.0–7.0 | and a texture determined by means of the Test 2 and identified by the following values

| | |
|---|---|
| Hardness (kg) | 0.4–1.5 |
| Energy (Kg × mm) | 1.5–4.5 |

(the parameters of the tests will be defined in the following).

Employing the process according to this invention, the freezing of the product formed down to the temperature of −30° C. is to be carried out in very short times (maximum 20 minutes) in order to avoid the formation of large ice crystals inside the product, said crystals being capable of exerting a negative influence on the quality of the texture.

The freeze-drying process is to be carried out according to the ways usually employed but taking into account the need for keeping the surface of the product during the freeze-drying process at a temperature lower than 30° C. in case one wants to keep a high number of living milk ferments.

Moreover, for the products according to this invention, the residual moisture is not to be too low because such freeze-dried products, differently to freeze-dried ice-creams, are very stable even at residual moisture of medium-hiqh values (4–6%).

Such feature, also in the light of the fact that it is very difficult to remove the residual water, gives a double advantage:

1) the duration of the freeze-drying cycle is much shorter so that the cost of the process is sharply lower;
2) the product is kept at a temperature higher than room temperature for a shorter time period with remarkable benefits for the survival of milk ferments.

Accordingly, the products are stable at a moisture content higher than that of ice-creams because on equal moisture values such products have a value of glass transition temperature (Tg) sharply higher, according to the results reported in the following table:

| | Moisture (%) | Tg (°C.) |
|---|---|---|
| yogurt bar | 4.5 | +12° |
| ice-cream | 2.8 | −10° |

Indeed, according to the new scientific branch which is called Food Polymer Science (Frank et al., 1990), the stability of a product depends on the value of Tg and the shelf life increases with decreasing the temperature difference between the room temperature and the value of Tg of the product.

As is well known, the noun "texture" as applied to foodstuffs means the attribute of a substance resulting from a combination of physical properties by the sense of touch, including kinaesthesis and mouthfee, sight and hearing. Physical properties may include size, shape, number, nature and conformation of constituent structural elements.

Such intrinsic characteristic which is detected at the organoleptic level, differentiates a yogurt based snack from other freeze-dried products.

Tests concerning the texture of products realized by means of the process according to this invention are reported in the following together with tests concerning the texture of products realized according to the prior art with the object of showing through an instrumental estimate carried out by means of an Instron UTM, Model 4301, such texture difference between the yogurt based snack and the freeze-dried ice-cream in an objective way.

MATERIALS AND METHODS

Two tests have been performed to that end, and the profiles obtained resulting from the relationship between force and displacement have been interpreted with reference to the fundamentals of the General Food Texture Profile Analysis.

Test No. 1

A) Operative parameters:

i) chisel type probe obtained from a steel cylinder of 8 mm diameter;
ii) length of the cutting base 8 mm;
iii) width of the cutting base 0.5 mm;
iv) angle of the tapered portion 22°
feeding speed     5 mm/min
applied force     10 kg
sizes of the sample:

i) thickness      9 ± 1 mm
ii) width         from 15 to 30 mm
iii) length       from 15 to 20 mm
B) Rheological parameters detected:

strain modulus (kg × mm$^{-1}$)
hardness (kg)

From the action exerted by the chisel-type probe on the test sample, a rectilinear pattern is obtained (see the enclosed FIG. 1) which points out the increase in the force necessary for increasing the penetration depth till the breaking of the test sample itself. The slope of such straight line represents the so-called "strain modulus" or simply the "modulus", and it is an index of the strength of the product. It is expressed as kg×mm$^{-1}$.

Figure 1:
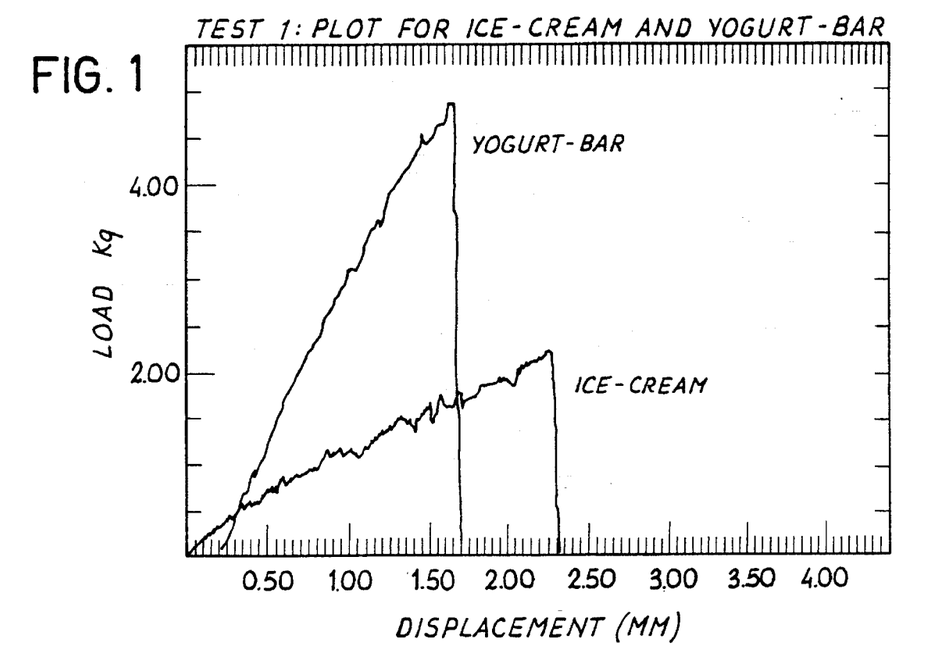
FIG. 1 shows the strain pattern obtained by a chisel-type probe on the test sample.

The force necessary to obtain the breaking of the test sample is defined as the "hardness". It is expressed as kg.

Test No. 2

A) Operative parameters: - cylindrical probe 0.8 mm feeding speed          5 mm/min
penetration depth      6 mm
applied force          10 kg
sizes of the test sample:

i) thickness           9 ± 1 mm
ii) width and length are of no influence as far as the objects of the test are concerned.
B) Rheological parameters detected hardness (kg)
energy for the penetration to the depth of 6 mm (kg × mm).

Figure 2:
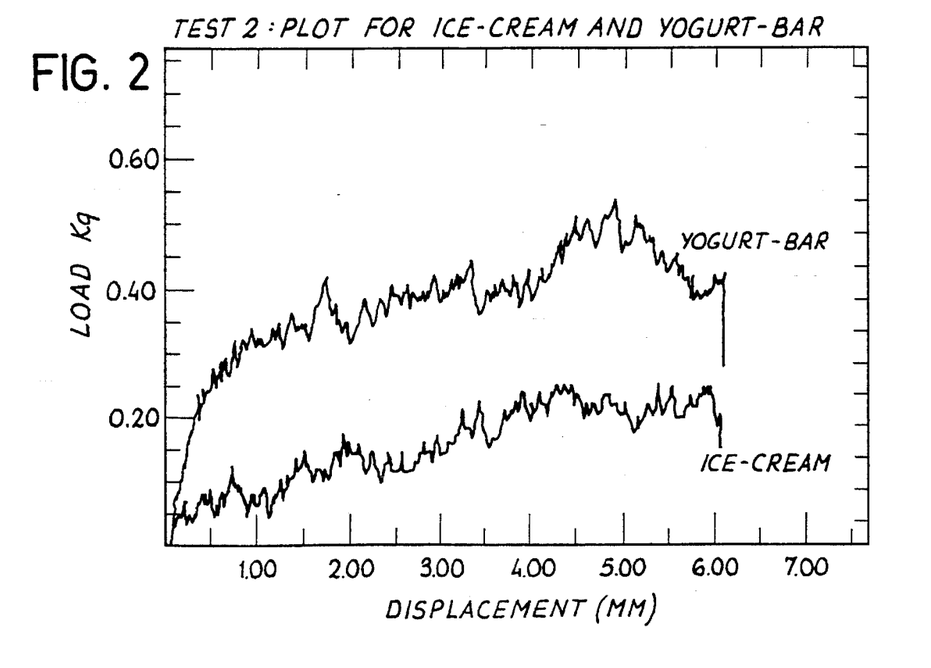
FIG. 2 shows the strain pattern obtained by a cylindrical probe on the test sample.

A pattern of the type represented in the enclosed FIG. 2 is obtained from the stress exerted by the cylindrical probe on the test sample.

The maximum force observed in that pattern is defined as the "hardness" and it is expressed as kg.

Moreover, in that test the work done for penetrating the test sample of the product to 6 mm is calculated. Such magnitude which is also called "energy" is expressed as kg×mm.

Each test has been carried out on at least 20 test samples. A statistical inference has been carried out exploiting the average values obtained in order to evaluate with high probability the values of the rheological indices of the all population of the product.

To that end, the standard deviation has been subtracted from or added to the average value ($\bar{x}$) of each parameter, after multiplying such standard deviation (s) by 2.6. Said coefficient 2.6 allows the 99% of the total area under the curve of the normal distribution to be intercepted, and the probability of selecting a variant comprised within the limits obtained reaches the value of 99/100.

Accordingly, the confidence interval is calculated as follows: $\bar{x} \pm 2.6$ s.

Tables 1 and 2 report the values of the texture parameters obtained respectively in the tests 1 and 2.

From the results shown in Table 1, the higher firmness of the yogurt product with respect to that of the freeze-dried ice-cream is put into evidence.

Indeed, in the yogurt based product, both the strain modulus and the hardness have average values higher than those recorded in the ice-cream. Moreover, there is no overlapping also between the confidence intervals calculated for both parameters (see the enclosed FIG. 3).

The same tendency is also put into evidence by Table 2. The determination of the work done for penetrating the test piece of the product to a depth of 6 mm gives an indication of the muscular effort exerted during mastication. Thus, as can be observed from the values reported, this index in the case of the yogurt is sharply higher than that of the ice-cream.

Figure 3A:
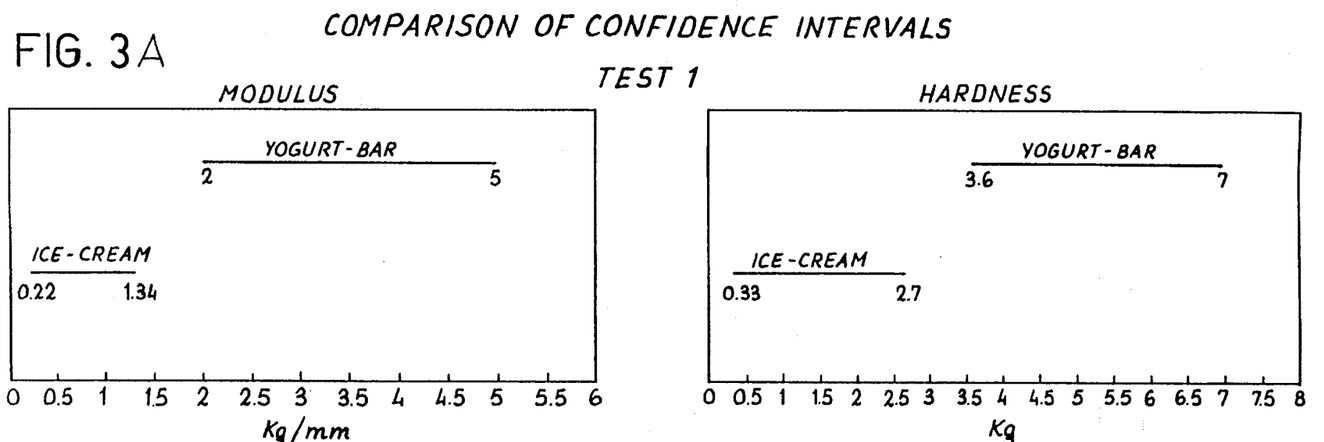
FIG. 3 shows a comparison of confidence intervals.
Figure 3B:
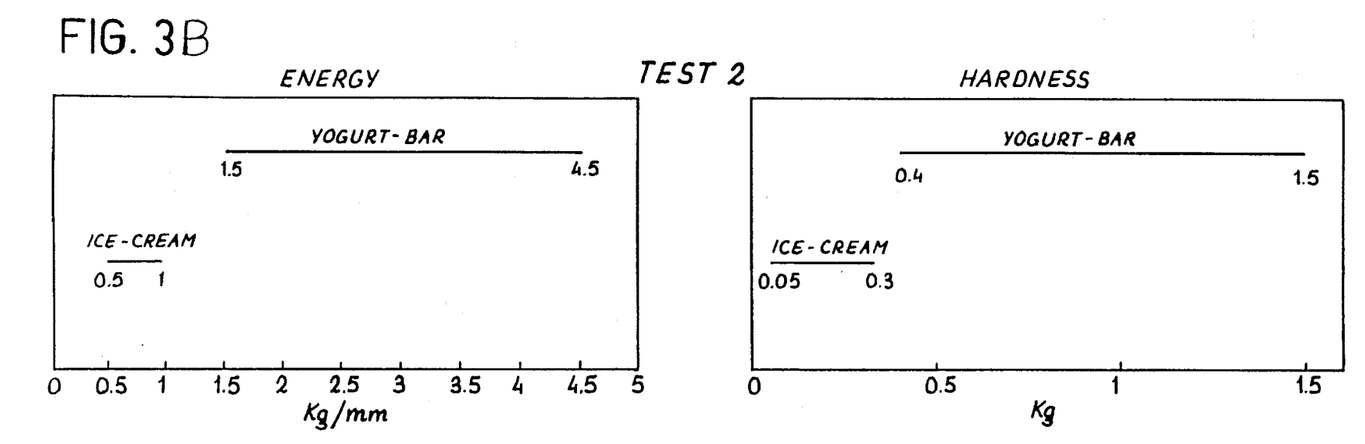

In this test also, there is no overlapping between the confidence intervals of the parameters detected (FIG. 3).

As a conclusion, it can be asserted that the "cellular" structure of the freeze-dried ice-cream opposes less resistance to the stresses exerted during the tests with respect to the more compact structure of the yogurt, and hence that there is an unequivocable texture difference between the two products both from the qualitative and from the quantitative standpoint.

TABLE 1

Confidence interval of the rheological indices detected in test No. 1

| Product | Yogurt | Ice-cream |
|---|---|---|
| Rheological parameter | | |
| strain modulus (kg × mm 1) | 2.9 ± 0.88 | 0.78 ± 0.56 |
| hardness (kg) | 4.91 ± 1.13 | 1.5 ± 1.17 |

TABLE 2

Confidence interval of the rheological indices detected in test No. 1

| Product | Yogurt | Ice-cream |
|---|---|---|
| Rheological parameter | | |
| Hardness | 0.55 ± 0.15 | 0.19 ± 0.14 |

TABLE 2-continued

Confidence interval of the rheological indices detected in test No. 1

| Product | Yogurt | Ice-cream |
|---|---|---|
| (kg) | | |
| Energy (kg mm) | 2.6 ± 0.4 | 0.74 ± 0.23 |

Some working examples of the process according to the present invention are now reported, such examples being intended just for illustrative and not for limitative purposes.

EXAMPLE 1

The following recipe is employed for the preparation of this product:

| | |
|---|---|
| natural whole yogurt containing living ferments (1. Bulgaricus and s.Thermophilus) | 57.75% |
| whole milk containing living ferments (1. Acidofilus and Bifidobacterium) | 19.25% |
| dextrose | 14.77% |
| inulin | 4.70% |
| concentrated coffee at 30° Bx | 3.30% |
| flavors | 0.20% |
| ascorbic acid | 0.03% |

A coating based on hydrogenated vegetable fats, yogurt-flavored.

The Production Process

In a mixer with a cold water (+4° C.) jacket, fresh yogurt and fresh milk, both at +4° C., are loaded When the loading of such ingredients is over, dextrose is added together with the pre-mixed powder ingredients, keeping a slow stirring. Then the mixture is stirred till full dissolution (15 minutes) and then the mixture is transferred to the pre-freezing freezer.

The mixture is then pumped through a pre-freezing freezer that lowers the mixing temperature down to −5°/−6° C., so partially freezing water, and an amount of 20% nitrogen is added to the mixture. In this unit operation and till the extrusion process, pressure is kept at a value below 1 bar so as to keep the destruction of living milk ferments to a minimum value.

The product extruded in the shape of a small bar of 3 cm width, 0.8–1 cm height and 9 cm length, is immediately deep-frozen at −30° C. in a period of 15–20 minutes.

The small bars so deep-frozen are metered into refrigerated trays in order to avoid a temperature increase in the product. The tray load is of 6.6 kg/m$^2$.

For carrying out the freeze-drying process, the trolleys are drawn out of the refrigerator cells, then they are put into the freeze-dryer, then the vacuum is obtained and the heating of the plates is started immediately (i.e. without waiting for the cooling of the product through evaporation-sublimation). The freeze-drying process occurs employing the following parameters:

| | |
|---|---|
| maximum temperature of the plates | 60° C. |
| maximum temperature of the surface of the product | 30° C. |
| pressure inside the freeze-dryer | 0.4 mbar |
| duration of the freeze-drying cycle | 12 hours |

When the freeze-drying is over, nitrogen is introduced into the freeze-dryer for breaking the vacuum, then the trolleys are drawn out of the freeze-dryer and the product is kept in an environment at a low value of humidity (relative humidity 25%) waiting for the moment when the product itself is coated and packaged.

The residual moisture of the product when the freeze-drying process is over is of 4–6%.

The number of living milk ferments in 1 g of the freeze-dried product is always higher than 10. Such cell count is determined by the mpn method and more precisely by inoculating increasing dilutions of the freeze-dried product into test tubes containing 9 ml of whole milk.

The texture of the freeze-dried product as determined on the Instron is as follows:

| Test 1 | |
|---|---|
| Modulus (kg mm$^{-1}$) | 1.8–4.1 |
| Hardness (kg) | 3.0–5.7 |
| Test 2 | |
| Hardness (kg) | 0.5–0.7 |
| Energy (kg mm) | 1.6–3.3 |

EXAMPLE 2

In this instance the following recipe was employed:

| | |
|---|---|
| natural whole yogurt containing living ferments (1. Bulgaricus and s. Thermophilus) | 36.18% |
| whole milk containing living ferments (1. Acidofilus and Bifidobacterium) | 36.18% |
| dextrose | 19.06% |
| banana smash | 6.89% |
| powdered skimmed milk | 1.61% |
| soya lecithin | 0.02% |
| ascorbic acid | 0.03% |
| flavors | 0.03% |

A coating based on yogurt-flavored, hydrogenated vegetable fat composition.

The Production Process

Into a mixer having a jacket for circulation of cold water at +4° C. the fresh yogurt and the fresh milk, both at the temperature of +4° C. are loaded. When the loading of these ingredients is over, dextrose and all other powder ingredients previously mixed are added, keeping a slow stirring. Then the mixture is stirred till complete dissolution (15 minutes) and then pumped through a freezer that lowers the temperature of the mixture to −8°/−11° C., so partially freezing the water and adding an amount of 10% of nitrogen to the mixture. In this unit operation and till the extrusion process, the pressure is controlled so that it never goes over 1 bar in order to keep the destruction of the living milk ferments to a minimum.

The product so extruded in the shape of a small bar of 3 cm width, 0.8–1 cm of height and 8 cm length, is deep-frozen immediately at 30° C. in a time period of 15–20 minutes.

The small bars so deep-frozen are metered into refrigerated trays in order to avoid any increase in the temperature of the product. The tray load is of 6.7 kg/mm$^2$.

In order to proceed with the freeze-drying process, the supporting trolleys are drawn out of the refrigerators and put into the freeze-dryer, then the vacuum is obtained and the heating of the plates is started immediately (i.e. without waiting for the spontaneous cooling of the product through evaporation-sublimation). The freeze-drying is carried out employing the following parameters:

| | |
|---|---|
| maximum temperature of the plates | 60° C. |
| maximum temperature of the product | 30° C. |
| pressure inside the freeze-dryer | 0.4 mbar |
| duration of the freeze-drying cycle | 12 hours |

When the freeze-drying is over, nitrogen is introduced into the freeze-dryer for breaking the vacuum, then the trolleys are drawn out and the product is kept in an environment at a low relative humidity (relative humidity 25%) while waiting for the carrying out of the coating and packaging procedures.

The residual moisture of the product when the freeze-drying is over is of 4–6%.

The number of living milk ferments in 1 g of the freeze-dried product is always higher than 10$^6$. Such cell count is determined by the mpn method and more precisely by inoculating increasing dilutions of the frezee-dried product in test-tubes containing 9 ml of whole milk.

The texture of the freeze-dried product as determined on the Instron is as follows:

| Test 1 | |
|---|---|
| Modulus (kg/mm) | 1.9–3.9 |
| Hardness (kg) | 3.0–6.8 |
| Test 2 | |
| Hardness (kg) | 0.5–0.8 |
| Energy (Kg mm) | 2.2–3.3 |

EXAMPLE 3

The following ingredients are processed:

| | |
|---|---|
| apple smash | 41.8% |
| natural whole yogurt | 15.0% |
| dextrose | 8.0% |
| lemon juice | 1.6% |
| pectin | 0.5% |
| natural flavours | 0.1% |
| deep-frozen apple dices i.q.f. (individual quick frozen) | 33.0% |
| coating: plain chocolate containing cocoa butter. | 32–34 |

All solid ingredients, i.e. dextrose and pectin, are first mixed.

Then lemon juice, flavors and the solid ingredient mixture mentioned above are added to the apple smash kept under stirring.

The mixture is cooled with continuous mixing till reaching a temperature in the range from −5° to −12° C. after blowing air in amounts from 10 to 30% of the initial volume of the product.

The apple dices are then added to the cold and viscous mass previously obtained, dispersing them throughout the same in a uniform way.

The product is then subjected to the forming operation for obtaining the predetermined sizes.

The product is deep-frozen at a temperature between −30° C. and −40° C., and next it is placed on the pre-cooled trays of the freeze-dryer.

Finally the product is freeze-dried by means of a cycle suitable to the sizes of the pieces as well as to the amounts of them on the trays. In particular, in the case of 1 cm thickness bars, freeze-drying is carried out as follows:

| maximum temperature of plates | 60° C. |
|---|---|
| maximum temperature of the product surface | 30° C. |
| freeze-drying cycle duration | 13 h |
| pressure inside the freeze-dryer | 0,3 mmHg |

When the freeze-drying process is over, the residual moisture of the product is 3–4%.

The texture of the freeze-dried product as determined on the Instrom apparatus and following the already disclosed procedure, is as follows:

| Test 1 | |
|---|---|
| Modulus (kg/mm$^{-1}$) | 1.9–3.4 |
| Hardness (kg) | 3.0–5.8 |
| Test 2 | |
| Hardness (kg) | 0.4–0.8 |
| Energy (kg*mm) | 1.6–3.3 |

The freeze-dried product is cell counted from the trays, subjected for removing broken pieces, and sent to the chocolate-icing plant.

Finally, the product is again subjected to selection and packaged.

As a variant to the procedure detailed above, durung the icing operation the product can be spread with dry or dried fruit, or with puffed cereals, small chocolate pieces and so on.

EXAMPLE 4

The following ingredients are subjected to the process:

| natural whole yogurt | 70.0% |
|---|---|
| strawberry smash | 13.1% |
| dried red beets | 1.3% |
| strawberry flavor | 0.2% |
| soya lecithin | 0.1% |
| dextrose | 15.2% |
| L-ascorbic acid | 0.1% |
| coating: based on hydrogenated, lemon-flavored vegetable fats. | |

First the dried red beets, soya lecithin, dextrose and ascorbic acid (solid ingredients) are mixed, and the mixture is then added together with strawberry flavor to the yogurt and to the strawberry smash.

The mass is mixed further so as to make the distribution of the ingredients uniform throughout the mixture, keeping the temperature at +4° C.

Then, in 15 minutes, the mixture is cooled with continuous mixing and under atmospheric pressure till the product starts showing a semisolid texture (between –5° C. and –12° C.) and an air percentage of 10–30% of the initial volume has been trapped.

Then the product is subjected to extrusion forming, taking care that the product does not undergo superficial thawing and that trapped air does not leak out.

The product is deep-frozen at a temperature of –30° C. in 20 minutes, and next it is placed on the previously cooled trays of the freeze-dryer at the ratio of 6.8 kg/$^2$, keeping the temperature of said product constantly at the value of –30° C.

Freeze-drying in the case of product rods of 1.2 cm diameter is carried out as follows:

| maximum temperature of plates | 65° C. |
|---|---|
| maximum temperature of the product surface | 30° C. |
| pressure inside the freeze-dryer | 0.3 mmHg |
| freeze-drying cycle duration | 8 h |

When the freeze-drying process is over, the vacuum is filled with nitrogen and the residual moisture is between 4 and 6%, and the number of living milk ferments is $\geq 10^6$.

The value of texture as determined on the Instron apparatus and following the procedures already disclosed above, is as follows:

| Test 1 | |
|---|---|
| Modulus (kg/mm$^{-1}$) | 1.9–4.4 |
| Hardness (kg) | 3.1–5.8 |
| Test 2 | |
| Hardness (kg) | 0.5–0.8 |
| Energy (kg*mm) | 1.5–2.8 |

The freeze-dried product is taken away from the trays, subjected to selection, iced with lemon-flavored coating and packaged.

It is also possible to obtain a product having more flavors combined together within the same piece, if mixtures having similar features but different flavours are processed in a parallel way, extruding the mixture with an extruder capable of putting together the mixtures. For instance, it is possible to extrude a small bar a half of which has a "strawberry yogurt" flavor while the other half has a "vanillin yogurt" flavor.

Vanillin yogurt is prepared in that case in the same way as the strawberry yogurt, employing the following formulation:

| natural whole yogurt | 80.0% |
|---|---|
| dextrose | 19.7% |
| soya lecithin | 0.1% |
| ascorbic acid | 0.1% |
| vanillin flavor | 0.1% |

We claim:

1. A process for the preparation of yogurt based, freeze-dried foodstuffs including living milk ferments, said process comprising the steps of:

a) cold mixing ingredients of the yogurt based, freeze-dried foodstuffs into a homogenous mixture:

b) pre-freezing the ingredients and adding a gas in an amount of between 10 to 50% based on the initial volume of the ingredients to form a product:

c) shaping the product into the desired shape;

d) deep-freezing the shaped product at a temperature in the range from –20° C. to –40° C.; and e) freeze-drying the product to obtain a residual moisture content of between 3% to 8% to form a freeze-dried food product having more than $10^6$ living milk ferments per gram of product and wherein the texture of the product is characterized by a modulus of 1.8–5.0 kg/mm and a hardness of 3.0–7.0 kg.

2. A process according to claim 1, characterized in that at the end of the freeze-drying process the vacuum is replaced by introducing nitrogen into the freeze-dryer.

3. A process according to claim 1, such that after the step e) an icing step f) is carried out employing chocolate or otherwise any coating step is carried out employing a film of cellulose, gum, wax, maltodextrins, milk proteins or sugars.

4. A process according to claim 1, such that after said step e) a packaging step g) is carried out.

5. A process according to claim 1, wherein the operation of mixing the ingredients according to the step a) occurs at a maximum temperature of +10° C.

6. A process according to claim 1, such that a time not longer than 0.5 hours must elapse between the step a) and the step b).

7. A process according to claim 1, wherein the pre-freezing operation is carried out at a pressure which is less than or equal to 1 bar, and a gas is added in amounts in the range from 10 to 30% of the initial volume.

8. A process according to claims 1, wherein said gas is nitrogen or air.

9. A process according to claim 1, wherein the shaping operation according to the step c) is carried out by extrusion at a temperature of −5° to −9° C.

10. A process according to claim 1, wherein the thickness of the product is less than 15 mm.

11. A process according to claim 1, wherein the rapid freezing according to the step d) is carried out down to a temperature of −30° in a maximum time of 20 minutes.

12. A process according to claim 1, wherein the freeze-drying process of the step e) is carried out at a surface temperature of the product not higher than 30° C.

13. A process according to claim 1, wherein the freeze-drying process according to step e) is interrupted at a final moisture between 4 and 6%.

14. Yogurt based freeze-dried foodstuffs obtained by means of the process according to any one of the preceding claims, said foodstuffs comprising:

| | |
|---|---|
| Yogurt | 10–85% |
| Fruit | 0–85% |
| Sugars | 0–25% |

Other ingredients and additives to balance up to 100%.

15. Foodstuffs according to claim 14, wherein said sugars are dextrose.

16. Foodstuffs according to claim 14, wherein said other ingredients comprise proteins, vitamins, minerals, food fibres emulsifying agents, bio-protecting agents, and bulking agents.

17. Foodstuffs according to claim 14, wherein said additives comprise flavoring agents, anti-oxidants, and coloring agents.

18. Foodstuffs according to claim 14, wherein yogurt is present in the same in amounts larger than or equal to 70%.

19. Foodstuffs according to claim 14, wherein yogurt and fruit are present in total amounts greater than or equal to 80%.

20. Foodstuffs according to claim 14, characterized in that they have a texture which is identified by the following values:

| | |
|---|---|
| Hardness (kg) | 0.4–1.5 |
| Energy (kg × mm) | 1.5–4.5 |

21. Foodstuffs according to claim 14, wherein the ingredient mix has an amount of total unfrozen water at −20° C. less than or equal to 10% of freezable water.

22. A process according to claim 10, wherein the thickness of the product is between 8–12 mm.

* * * * *